Feb. 23, 1960 F. O. RICKERS 2,926,087
METHOD OF CARBONATING A MALT BEVERAGE
Filed April 8, 1959
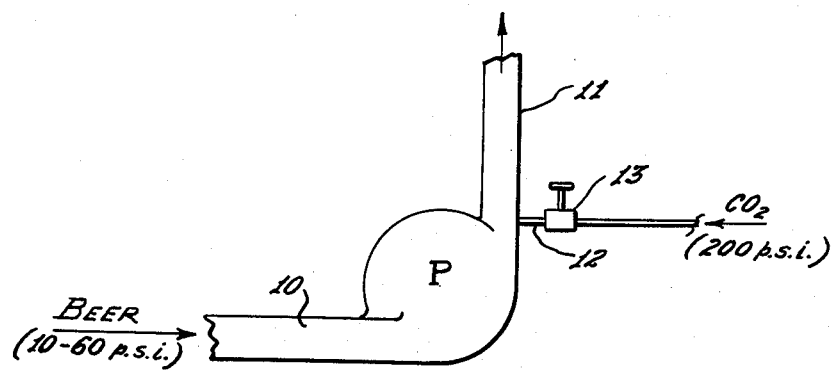
INVENTOR.
FRANK OTTO RICKERS.
BY
ATTORNEYS.

United States Patent Office 2,926,087
Patented Feb. 23, 1960

2,926,087

METHOD OF CARBONATING A MALT BEVERAGE

Frank Otto Rickers, Cincinnati, Ohio, assignor to The Geo. Wiedemann Brewing Co., Newport, Ky., a corporation of Kentucky Application April 8, 1959, Serial No. 804,965

8 Claims. (Cl. 99—49)

This invention relates to a method of carbonating a malt beverage. It will be described herein particularly in connection with the brewing of beer, but it will be understood that the method is applicable to the brewing of all other malt beverages.

There are several ways in which beer has been carbonated in the past. One procedure involves the use of so-called saturators, in which the beer is caused to pass through an atmosphere of carbon dioxide in the form of small droplets or thin sheets. The temperature and pressure are controlled and the contact time is made long enough, so that a desired degree of carbonation may be obtained.

In another procedure carbon dioxide is injected into the beer. In this procedure successful carbonation depends upon the small size of the bubbles of the carbon dioxide which provide a large surface exposure for speedy solution.

In the so-called Zahm system carbon dioxide gas was forced through porous cylinders disposed in the bottom of tanks. With this system carbonation usually takes about twenty-four hours. More rapid carbonation may be accomplished by injecting the carbon dioxide into beer flowing through pipes. Here again the Zahm carbonating stone can be used, but its capacity is low.

In the "Demarcus" system the beer was caused to flow through a double plate arrangement containing small passages through the side walls of which the carbon dioxide gas was introduced. The plate, however, slowed up the beer flow, and the amount of gas absorbed was also limited.

All prior art systems of carbonation utilize carbon dioxide at a pressure in the vicinity of 60 pounds per square inch. Carbon dioxide gas is usually and most economically supplied at a pressure of 180 pounds per square inch and higher. As a result it has always been found necessary to provide for pressure reduction, and this has necessitated the use of heating systems because of the tendency to freeze due to the rapid cooling when the gas was permitted to go from a pressure of 180 pounds per square inch to about sixty pounds per square inch.

With the foregoing considerations in mind it is an object of the present invention to provide for the use of carbon dioxide at the pressure at which it is supplied, i.e. 180 pounds per square inch or more. It is therefore an ancillary object to avoid any pressure reduction system which has been required heretofore. It is another object of the invention to inject the carbon dioxide at high pressure directly into the flow of beer through a pipe, wherein the beer is at a very much lower pressure, whereby a fogging action is achieved giving maximum surface contact for absorption of the carbon dioxide by the beer.

Generally speaking, therefore, one of the principal objects of the invention is to provide a method for carbonating beer at a very much more rapid rate than has been possible heretofore.

The foregoing and other objects of the invention which will be pointed out in more detail hereinafter or which will become apparent to one skilled in the art upon reading these specifications, I accomplish by that series of steps of which I shall now describe exemplary embodiments.

Reference is made to the drawing forming a part hereof and in which the single figure is a diagrammatic showing of a portion of a brewing plant to show how the invention is practiced.

Briefly in the practice of the invention I utilize carbon dioxide at high pressure, say 180 or 200 pounds per square inch, and I inject the carbon dioxide at this pressure, directly into a stream of beer which is at a relatively low pressure of from 10 to 60 pounds per square inch. The carbon dioxide is introduced or injected at a controlled rate through a flow control valve, the setting of which may be determined empirically for best results.

Referring now more in detail to the drawing, I have shown a pipe 10 through which beer at a pressure of 10 to 60 pounds per square inch is caused to flow by means of a pump P from one station in the processing of the beer. The pump P forces the beer on through another pipe 11 to a succeeding station in the processing plant.

Generally speaking beer will be pumped from a fermentation tank to ruh storage, and then from ruh storage to a surge tank, then from a surge tank to a finishing station and finally from a finishing station to the government cellar. Between each of these stations the beer is pumped from one to the next station. I preferably inject carbon dioxide into the beer between each of the foregoing stations but preferably the principal injection is made while the beer is being pumped from ruh storage to the surge tank.

The carbon dioxide is injected through a pipe 12 directly into the pipe 11 at a point as close as practicable to the discharge of the pump P. Preferably the pipe 12 will enter the pipe 11 within an inch or two of the discharge of the pump P.

Flow of carbon dioxide is achieved by means of a flow control valve 13. The flow control valve is preferably a straight line metering valve, i.e. one wherein the flow of gas passing through the valve is proportional to the movement of an indicator on a scale, whereby the operator can know the rate of flow and select a desired rate.

When the carbon dioxide at a pressure of 180 or 200 pounds per square inch is released into the stream of beer at a pressure of 10 to 60 pounds per square inch, the carbon dioxide undergoes a violent expansion producing a fog-like action, which provides for maximum surface contact for absorption by the beer. The cooling effect of the sudden expansion of the carbon dioxide is absorbed by the beer itself without harm.

By the practice of the process herein described beer can be carbonated at rates very much higher than those which have been achieved in the past. For example, I have achieevd carbonation at the rate of 600 barrels per hour from 1.2 volumes to 2.8 volumes of carbon dioxide. In other words the gas content is substantially doubled at a rate of 600 barrels per hour.

The setting of the flow control valve is a matter of trial and error. The beer is checked with a Zahm-hartung volume meter after the addition of the carbon dioxide gas. After just a very few tests the cellar man develops the ability to set the control valve accurately to achieve the desired carbonation.

It will be understood that numerous variations may be made in detail without departing from the spirit of the invention, and I therefore do not intend to limit myself otherwise than as set forth in the claims which follow.

Having now fully described my invention, what I claim as new, and desire to secure by Letters Patent is:

1. The method of carbonating a malt beverage, as a step in a brewing process wherein the said beverage is pumped at a pressure of 10 to 60 pounds per square inch from one station in the processing thereof, through a pipe, to another station by means of a pump, which comprises injecting carbon dioxide gas into said malt beverage as it flows through said pipe, at a controlled rate and at a pressure in excess of 180 pounds per square inch.

2. The method of claim 1, wherein said carbon dioxide is injected at a point as close as practicable to the discharge of said pump.

3. The method of claim 2, wherein said injection is carried out while the malt beverage is being pumped from ruh storage to the surge tank.

4. The method of claim 2, wherein said injection is carried out while the malt beverage is being pumped from the fermentation tank to ruh storage, and is repeated between ruh storage and the surge tank, between the surge tank and the finishing station, and again between the finishing station and the government cellar.

5. The method of carbonating a malt beverage, as a step in a brewing process wherein the said beverage is pumped at a pressure of from 10 to 60 pounds per square inch from one station in the processing thereof, through a pipe, to another station, by means of a pump, which comprises injecting carbon dioxide gas into said malt beverage as it flows through said pipe, at a controlled rate, and at a pressure at least three times that of the beverage into which it is injected, whereby to produce a fog-like action and to enhance the rate of absorption of the carbon dioxide into the beverage.

6. The method of claim 5, wherein said carbon dioxide is injected at a point as close as practicable to the discharge of said pump.

7. The method of claim 6, wherein said injection is carried out while the malt beverage is being pumped from ruh storage to the surge tank.

8. The method of claim 6, wherein said injection is carried out while the malt beverage is being pumped from the fermentation tank to the ruh storage, and is repeated between ruh storage and the surge tank, between the surge tank and the finishing station, and again between the finishing station and government cellar.

References Cited in the file of this patent

UNITED STATES PATENTS

| 475,853 | Feigenspan | May 31, 1892 |
| 589,056 | Zwietusch | Aug. 31, 1897 |
| 608,744 | Alberger | Aug. 9, 1898 |
| 1,261,294 | Ritchey | Apr. 2, 1918 |

FOREIGN PATENTS

| 12,413 of 1892 | Great Britain | Aug. 6, 1892 |